(No Model.)
F. W. WALQUIST, G. NELSON & J. L. GRONQUIST.
SAW.
No. 604,279. Patented May 17, 1898.
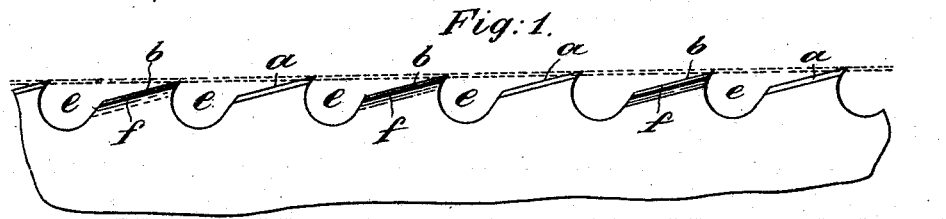
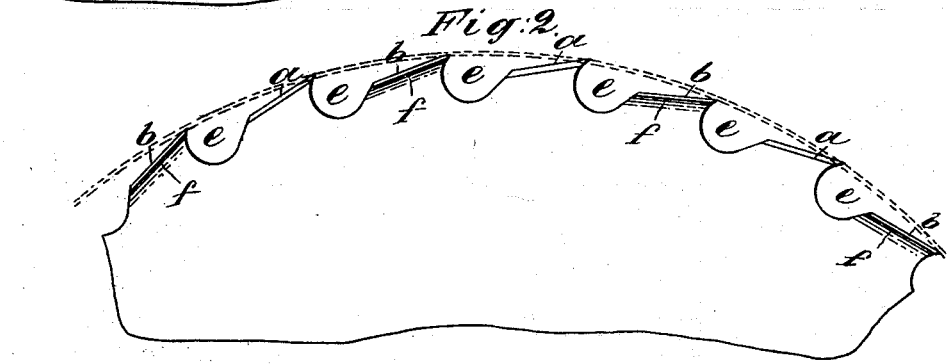
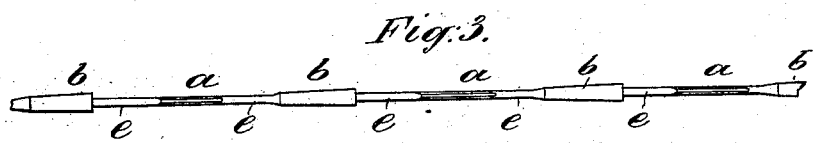
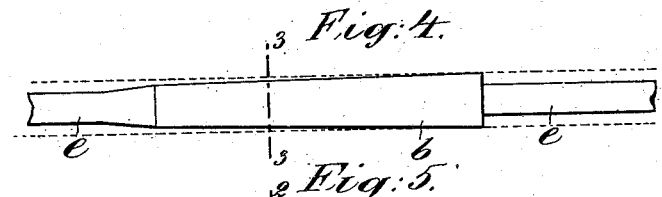
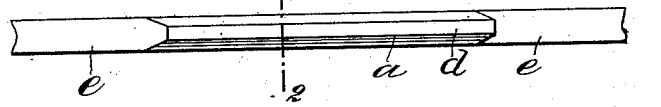
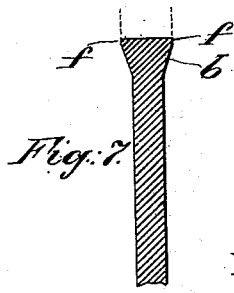
WITNESSES:
INVENTORS
Frank W. Walquist
Gulbrand Nelson
John L. Gronquist
By A. P. Thayer
Attorney.

UNITED STATES PATENT OFFICE.

FRANK W. WALQUIST, GULBRAND NELSON, AND JOHN L. GRONQUIST, OF BROOKLYN, NEW YORK; SAID WALQUIST ASSIGNOR OF ONE-THIRD OF HIS RIGHT TO HENRY O. TOWLES, OF WASHINGTON, DISTRICT OF COLUMBIA.

SAW.

SPECIFICATION forming part of Letters Patent No. 604,279, dated May 17, 1898.

Application filed December 18, 1896. Serial No. 616,116. (No model.)

*To all whom it may concern:*

Be it known that we, FRANK W. WALQUIST, GULBRAND NELSON, and JOHN L. GRONQUIST, citizens of the United States, and residents of Brooklyn, in the county of Kings and State of New York, have invented certain new and useful Improvements in Saws, of which the following is a specification.

Our invention relates to saws for sawing lumber; and it consists of improvements in the teeth, designed for producing smooth surfaces of the work, as hereinafter described, reference being made to the accompanying drawings, in which—

Figure 1 is a side elevation of part of a straight saw having teeth designed according to our invention. Fig. 2 is a side elevation of part of a circular saw having like teeth. Fig. 3 is an edge view of part of a saw having our improved teeth. Fig. 4 is a detail in edge view, enlarged, showing the front face of one of our improved teeth. Fig. 5 is another detail in edge view, enlarged, showing the front face of another form of teeth used intermediately of the teeth of Fig. 4. Fig. 6 is a cross-section of Fig. 5, line 2 2; and Fig. 7 is a cross-section of Fig. 4, line 3 3.

We employ two forms of teeth, as $a$ and $b$, in alternate relation to each other. The teeth $a$ have bevel sides $c$ and are narrower on the face $d$ than the thickness of the saw-plate, and the cutting points or edges have greater radial projection than the cutting edges of teeth $b$, the difference being about as much as the advance of the work per tooth in use, or a little more for cutting corresponding channels in advance of the teeth $b$. The teeth $b$ are wider than the saw-plate. They cut out the side portions of the material to be cut away that are left by the channeling-teeth, being of like extension each side of the saw-plate. Between the clearance-notches for the chips in front of the points of the teeth the teeth have outer faces $c$ and $d$ of considerable length from point to heel, which recede radially from the points backward for clearance only, or thereabout, and the teeth $b$ are upset uniformly along the face from the cutting edge backward, and the faces of teeth $a$ are likewise tapered along the face, so that being so made in the first place they are sharpened by gumming out the throat-notches only, and they serve without altering their sides until worn back to the rear ends of the faces, whereby being made true in the first place they remain so till thus worn out, when they are to be renewed as originally shaped.

It is to be particularly noted that teeth $b$ are formed with narrow side faces $f$, which are transversely parallel with the sides of the saw-plate, or may be slightly convergent thereto. These faces have material effect in lessening wabbling motion of the saw, and together with like effect of the channels cut in advance of the teeth $b$ make exceedingly smooth cutting saws, said channels affording more free relief of the cuttings from the finishing-teeth.

The side faces $f$ of the finishing-teeth bear alike on opposite sides of the teeth against the surface of the wood and counteract side thrusts.

We claim—

1. The combination in a saw of the alternate taper-faced channeling-teeth and the upset-faced finishing-teeth, the channeling-teeth being longer and narrower than the finishing-teeth substantially as described.

2. The combination in a saw of the alternate taper-faced channeling-teeth and the upset finishing-teeth, the channeling-teeth being longer and narrower than the finishing-teeth, and the finishing-teeth having the narrow side faces parallel, transversely, with the sides of the saw-plate substantially as described.

3. The combination in a saw of alternate channeling-teeth and finishing-teeth, the channeling-teeth being longer and narrower than the finishing-teeth, and the finishing-teeth being upset on the face and their sides tapered from the cutting edge backward substantially as described.

Signed at New York city, in the county and State of New York, this 24th day of November, A. D. 1896.

FRANK W. WALQUIST.
GULBRAND NELSON.
JOHN L. GRONQUIST.

Witnesses:
W. J. MORGAN,
A. P. THAYER.